(12) United States Patent
Schrapp et al.

(10) Patent No.: US 6,749,036 B1
(45) Date of Patent: Jun. 15, 2004

(54) SNOWMOBILE ACCESSORY ATTACHMENT SYSTEM AND INTEGRATED SNOWMOBILE CARGO RACK

(75) Inventors: Nick Schrapp, Roseau, MN (US); Bob Aronson, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 10/350,214

(22) Filed: Jan. 22, 2003

(51) Int. Cl.[7] .............................................. B62M 27/02
(52) U.S. Cl. ........................ 180/190; 224/408; 296/37.1
(58) Field of Search ................................. 180/190, 182, 180/219, 68.5; 224/408, 413; 114/55.57; 296/37.1; 297/215.12

(56) References Cited

U.S. PATENT DOCUMENTS

| | | | |
|---|---|---|---|
| 1,105,435 A | 7/1914 | Howell | |
| 3,220,623 A | 11/1965 | Bostwick | 224/32 |
| 3,658,358 A | 4/1972 | Baker | 280/150 R |
| 3,687,344 A | 8/1972 | Nixon | 224/29 R |
| 3,785,541 A | 1/1974 | Sibley | 224/42.08 |
| 3,795,354 A | 3/1974 | Stippich | 224/32 A |
| 4,163,513 A | 8/1979 | Kramer | 224/32 R |
| 4,588,114 A | 5/1986 | Lebaron et al. | 224/32 A |
| 4,773,573 A | 9/1988 | Doveri | 224/32 A |
| 4,893,692 A * | 1/1990 | Smith | 180/190 |
| 5,083,632 A * | 1/1992 | Saito et al. | 180/215 |
| 5,271,540 A | 12/1993 | Katz et al. | 224/32 A |
| 5,558,260 A * | 9/1996 | Reichert | 224/413 |
| 5,992,552 A * | 11/1999 | Eto | 180/190 |
| 6,179,182 B1 * | 1/2001 | Hayes | 224/408 |
| 6,299,042 B1 | 10/2001 | Smith | 224/431 |
| 6,336,579 B1 * | 1/2002 | Sako | 224/413 |
| 6,347,804 B1 | 2/2002 | Seibel | 280/288.4 |
| 6,378,643 B1 | 4/2002 | Galbraith et al. | 180/219 |
| 6,491,124 B1 * | 12/2002 | Thompson et al. | 180/190 |
| 6,499,784 B2 * | 12/2002 | Takahashi | 296/37.1 |

* cited by examiner

*Primary Examiner*—Lesley D. Morris
*Assistant Examiner*—Tony Winner
(74) *Attorney, Agent, or Firm*—Fredrikson & Byron, P.A.

(57) ABSTRACT

A snowmobile having an accessory attachment system and a cargo rack storage compartment. The snowmobile includes a chassis having a front portion, a central portion, and a rear portion. The front chassis portion mounts a pair of steerable skis and includes an engine cradle for mounting an engine that powers a drive track. The central chassis portion includes a drive tunnel having the drive track disposed therein, an operator seat being mounted to the top portion of the drive tunnel, a top portion of the tunnel supporting an operator seat. The rear chassis portion includes a rear close-off that reinforces the drive tunnel and defines a cargo rack storage compartment co-extensive with a portion of the drive tunnel. An optional passenger seat may be removably mounted above a portion of the storage compartment. The rear close-off also includes plurality of mounting points, such as hooks or bracket holes.

11 Claims, 5 Drawing Sheets

SNOWMOBILE ACCESSORY ATTACHMENT SYSTEM AND INTEGRATED SNOWMOBILE CARGO RACK

FIELD OF THE INVENTION

The invention relates to a snowmobile, and, in particular, to a snowmobile having an accessory attachment system and an integrated cargo storage rack.

BACKGROUND OF THE INVENTION

Snowmobiles are popular land vehicles for use in cold and snowy conditions. Snowmobiles may used as transportation vehicles or as recreational vehicles. Although primarily a recreational activity, snowmobiling also provides many useful functions. Snowmobiles may be relied upon by law enforcement units in snowy areas for search and rescue work and emergency missions. During such use, it is frequently necessary to transport a variety of cargo with the snowmobile. Snowmobiles are also used by surveyors, ranchers, public utility employees, environmental and wildlife scientists and others. Ski-touring centers across North America utilize snowmobiles for trail grooming and track setting. Snowmobiles are also widely used by cross country ski race officials, dog sled races, and by ski patrols for rescue purposes. In many uses, the desirability to stow cargo requires ample cargo or storage space in the snowmobile.

In general, a snowmobile has a central frame or chassis on or around which the various components of the snowmobile are assembled. Typically, a pair of skis are mounted at the front portion of the chassis. An engine cradle or bulkhead is defined by a plurality of front structural members of the chassis. The engine drives a ground-engaging endless track disposed in a longitudinally extending drive tunnel formed within the chassis. Generally horizontal footrests extend outwardly laterally from opposite sides of the chassis. The snowmobile suspension generally includes two systems, a front suspension system for the skis and a rear suspension system for the track.

Handling, cornering and ride quality are largely dependent upon the front suspension system of the snowmobile. The skis of a snowmobile may be independently suspended by means of respective suspensions. Some form of stabilizer or sway bar arrangement interconnecting the front skis may be provided to reduce the amount of leaning that occurs during cornering of the snowmobile.

The endless track is driven by an engine located in the bulkhead. In conventional snowmobiles, the track is provided under the chassis in such a manner that the entire length of the track is located beneath the drive tunnel formed by the chassis. A snow guard typically is provided at the rear of the chassis to prevent snow that the track engages from spraying excessively in an upward or rearward direction. The track is supported beneath the chassis by the rear suspension. The rear suspension is designed to provide a comfortable ride and to help absorb the shock of the snowmobile crossing uneven terrain.

The typical snowmobile tunnel is a unitary aluminum construction and is reinforced with braces inside the tunnel. Aluminum is generally used for tunnel construction because of its relatively light weight. Suspension pads are added to the tunnel (usually by riveting) where the suspension mounts to the chassis. The steel suspension pads reinforce the tunnel to prevent the suspension from tearing holes in the aluminum of the tunnel. A rack is separately mounted on the rear of the tunnel. Attaching the braces, pads, and rack is labor intensive, requiring extensive riveting, and can be expensive.

The vehicle body may comprise a seat with a storage compartment disposed generally rearward of the seat. A storage compartment may also be provided underneath the seat. Most snowmobiles require a cushioned seat for the rider to sit on for comfort, as well as safety. For many snowmobiles, weight is also an issue, and reduction in weight is desirable. For example, additional weight on a snowmobile contributes to the track sinking into the snow and stalling the snowmobile. The added weight also reduces fuel efficiency and speed.

Typically, a snowmobile seat comprises a rigid base and a cushion. The base may be formed of metal or plastic and is covered in a softer padding or cushion. The seat is typically formed as a unitary part that is bolted to the snowmobile chassis. Snowmobiles may be provided with a seat for supporting one person or with a seat for supporting two people Touring snowmobiles are often used to carry two individuals ("two-up riding"). It may not be preferable to have two seats at all times due to the extra weight of the second seat, the undesirable appearance of the second, empty, seat, and the wasted excess space of the second seat. Therefore, a removable or optional second seat for a passenger may be desirable. Such a removable seat allows the snowmobile to be tailored to one or two-up riding.

A variety of storage components are used with snowmobiles, especially touring snowmobiles. Frequently, a storage compartment is mounted rearward of at least a portion of the seat. Items may be stored in a storage compartment, however, the storage compartment is typically relatively small. Although some oversized storage compartments are available, these are still often inadequate for stowing snowmobile accessories. Further, in many designs, the storage compartment is not available in conjunction with a passenger seat. Another snowmobile configuration incorporates underseat storage, also usually relatively small.

In the place of, or in addition to, such storage compartments, cargo racks are often provided for attachment to the rear of the snowmobile. The storage compartments and/or racks provide storage rooms for cargo and/or snowmobile accessories. An accessory luggage rack (or rear cargo rack) may be attached to the rear of the snowmobile to afford more storage capabilities. A typical rack is relatively large, heavy, and can be expensive. The rack is often sold as an accessory (not as part of the snowmobile) and the snowmobile user must bolt the rack to the machine (generally such that the rack fits onto the backrest assembly and hangs rearwardly off the machine). Traditionally the rear portion of a touring snowmobile has consisted of a tunnel with reinforcement bracing on the inside and an accessory luggage rack attached to the back. However, this can be costly to assemble and adds extra weight.

Further, items may be hooked or attached to the snowmobile. For example, snowmobile accessories, due to their size, may need to be hooked or attached to the snowmobile. In some cases, bungee cords or tie straps are used to attach an accessory or carry-on to the snowmobile. Many accessory racks have places on which to hook a bungee. However, if an accessory rack is not purchased and installed, there is not generally a place on which to hook a bungee. A snowmobile user may then become creative and attempt to hook a bungee to a portion of the snowmobile not intended for such use. This may lead to snowmobile damage such as a portion of the body snapping off under the force of the hook or the hook sliding off because the body is not formed for receiving a hook.

SUMMARY OF THE INVENTION

One feature of the invention provides an integrated snowmobile cargo rack/storage compartment and drive tunnel.

The drive tunnel, supporting and containing the endless track, is preferably aluminum to provide a lightweight structure. A cargo rack/storage compartment, preferably formed of steel, is preferably mounted to the tunnel, and provides bracing and support for the aluminum tunnel. The cargo rack/storage compartment acts not only as a storage rack but also as tunnel bracing and rear suspension pads, thereby alleviating the need for extra tunnel bracing, suspension pads, etc. normally found with an aluminum drive tunnel. The storage compartment reduces the weight associated with separate braces, suspension pads, and rack attached to a tunnel. The storage compartment is positioned under an optional removable passenger seat.

The invention also provides a passenger seat that may be removable. An abbreviated trunk cover or storage lid may be provided for the covering the rear storage compartment when the passenger seat is attached. Removing the passenger seat expands the accessible area of the covered storage compartment. The snowmobile may be converted into a one-up sled by removing the abbreviated trunk cover or storage lid and passenger seat, and affixing a full-length trunk cover or storage lid. The full-length trunk cover or storage lid creates a sleek one-up look while providing rider comfort and increased accessible storage capacity. Additionally, by removing the second seat completely when the snowmobile is in its one-up configuration, the overall weight of the sled is decreased.

The invention also provides an accessory attachment system. In an embodiment of the snowmobile of the present invention, the storage compartment has several mounting points for mounting cargo to the sled. The mounting points may be mounting locations such as hooks or brackets. The bracket is mounted to the side of a rear side panel of the storage compartment. The bracket has two holes that are designed to accept mounting pins from an accessory to be mounted to the snowmobile. Three hooks are provided on the side panel of the storage compartment and each may be used to mount accessories or tie straps or bungee cords. All of these components may be hidden underneath a plastic cover. The plastic side covers include holes to receive, for example, bungee cords. Bungee cords go through the holes and are attached to cargo hooks hidden under the cover. Thus, accessory attachments may be quickly removed without requiring tools. Optionally, saddlebags may be provided with pins corresponding to the holes on the plastic cover. The pins are designed to go through holes provided on the plastic cover and attach to holes on the bracket on the tunnel.

DETAILED DESCRIPTION OF THE INVENTION

Figure 1:
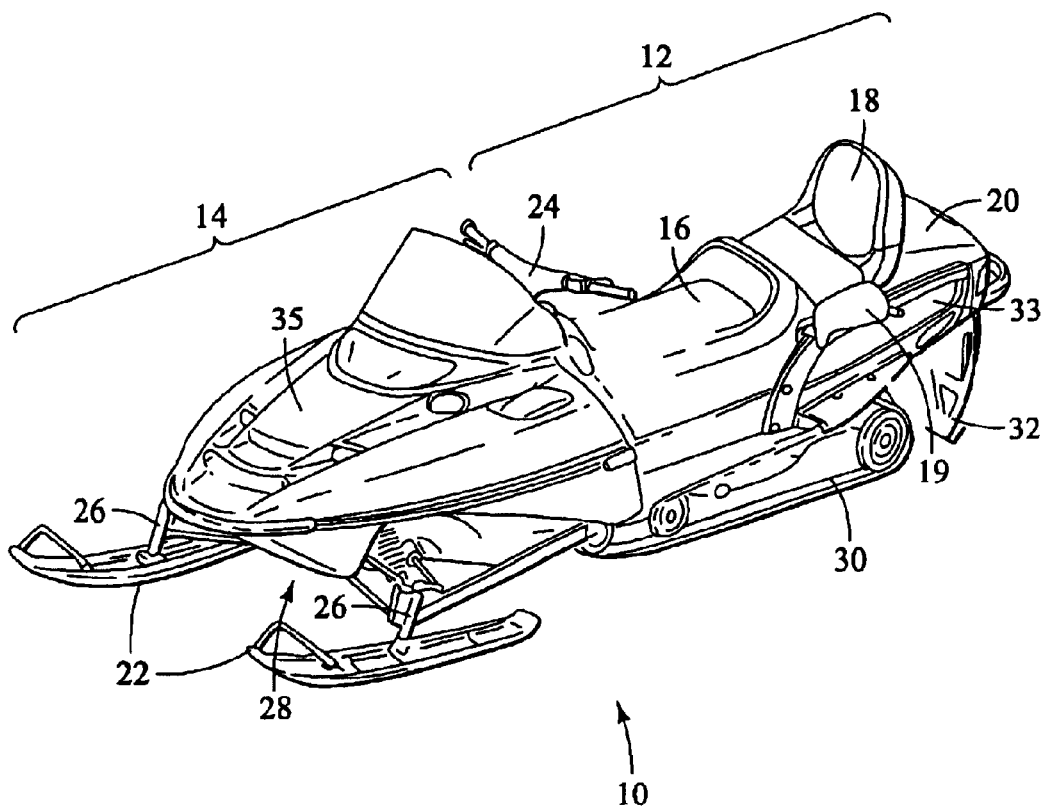
FIG. 1 illustrates a first embodiment of a snowmobile in accordance with the present invention.

FIG. 1 illustrates a first embodiment of a snowmobile 10 in accordance with the present invention. The body 10 of the snowmobile comprises a chassis (shown in detail in FIG. 2a). The body includes a rear body portion 12 and a front body portion 14. The rear body portion 12 or seat area accommodates an operator's seat 16 and an optional passenger seat 18 for seating an operator and passenger, respectively, in straddle fashion. Passenger grab handles 19 are provided for use by the passenger. An abbreviated trunk cover or storage lid 20 is provided for use with the passenger seat 18 to cover a rear storage compartment integrated with the chassis. An alternate full-length trunk cover or storage lid 80 (see FIG. 5) is provided for use when the optional passenger seat 18 is removed.

A pair of skis 22 are mounted along the front body portion 14 of the chassis. A handlebar assembly 24, positioned forward of the operator's seat 16, is conventionally connected to the skis 22 for steering the snowmobile 10. A front suspension system suspends the skis 22. The skis 22 are positioned at the laterally outermost end portions of suspension arms 26, which suspension arms 26 have, e.g., shock absorbers with coil springs, to absorb vibrations as the snowmobile 10 passes over uneven terrain. The skis 22 and the suspension arms 26 are constructed so that the skis 22 can be pivoted laterally to steer the snowmobile, e.g., by turning the handlebars 24.

Upon encountering an object during operation, whether the object be a chunk of snow or ice, a mogul, or any other object over which the skis pass, the suspension system is designed to permit the skis 22 to travel over the object while providing a relatively smooth, controlled ride to the operator.

An engine cradle 28 or bulkhead is positioned in the front body portion 14. Rearwardly of the skis 22 and beneath the operator's seat 16, the chassis suspends an endless track assembly 30 by a rear suspension system. The endless track 30 is a propulsion-providing track system and is laterally centrally mounted under the chassis in a longitudinally extending drive tunnel. The track is driven by the engine positioned in the engine cradle 28. The track system 30 has a belt-type tread or track which rotates around the periphery of the track system 30 to propel the snowmobile through the snow. The belt-type tread has a plurality of spaced ribs which extend from the exterior surface of the track 30. The ribs provide traction to the endless track 30.

The rear portion 12 of the snowmobile 10 includes the rear suspension system for supporting the rear portion of the snowmobile and defining the path of the track 30 which propels the sled across the snow. The rear suspension includes a front suspension arm and a rear suspension arm, each such arm extending downwardly and rearwardly from pivotal connections to the snowmobile frame or chassis. The lower end of each such-arm is secured, either directly or indirectly, to the suspension rails, beneath which the track slides. Springs and shock absorbers are typically provided to urge the slide rails down and away from the snowmobile tunnel, the springs and shocks acting to control the relative movement of the suspension with respect to the tunnel as the snowmobile moves over terrain of varying contours. The relative lengths and orientations of the suspension arms also control the movement and orientation of the suspension as it is compressed upwardly toward the tunnel. Any suitable rear suspension system may be used with the present invention.

The snowmobile 10 may further include a snow flap 32 that is pivotally connected to and extending from the rearmost portion of the chassis. The snow flap is positioned above the track system 30 and extends from an integrated cargo rack of the chassis. The snow flap 32 prevents or decreases the amount of snow that is sprayed up from the tread when the snowmobile 10 travels through the snow.

The snowmobile chassis includes protective paneling over a bulkhead, drive tunnel, and rear storage compartment of the snowmobile. For example, the side panel 33 covers sides of the rear storage compartment. Similarly, paneling 35 is provided over the bulkhead. The paneling may be constructed from high density polyethylene or plastic.

Figure 2A:
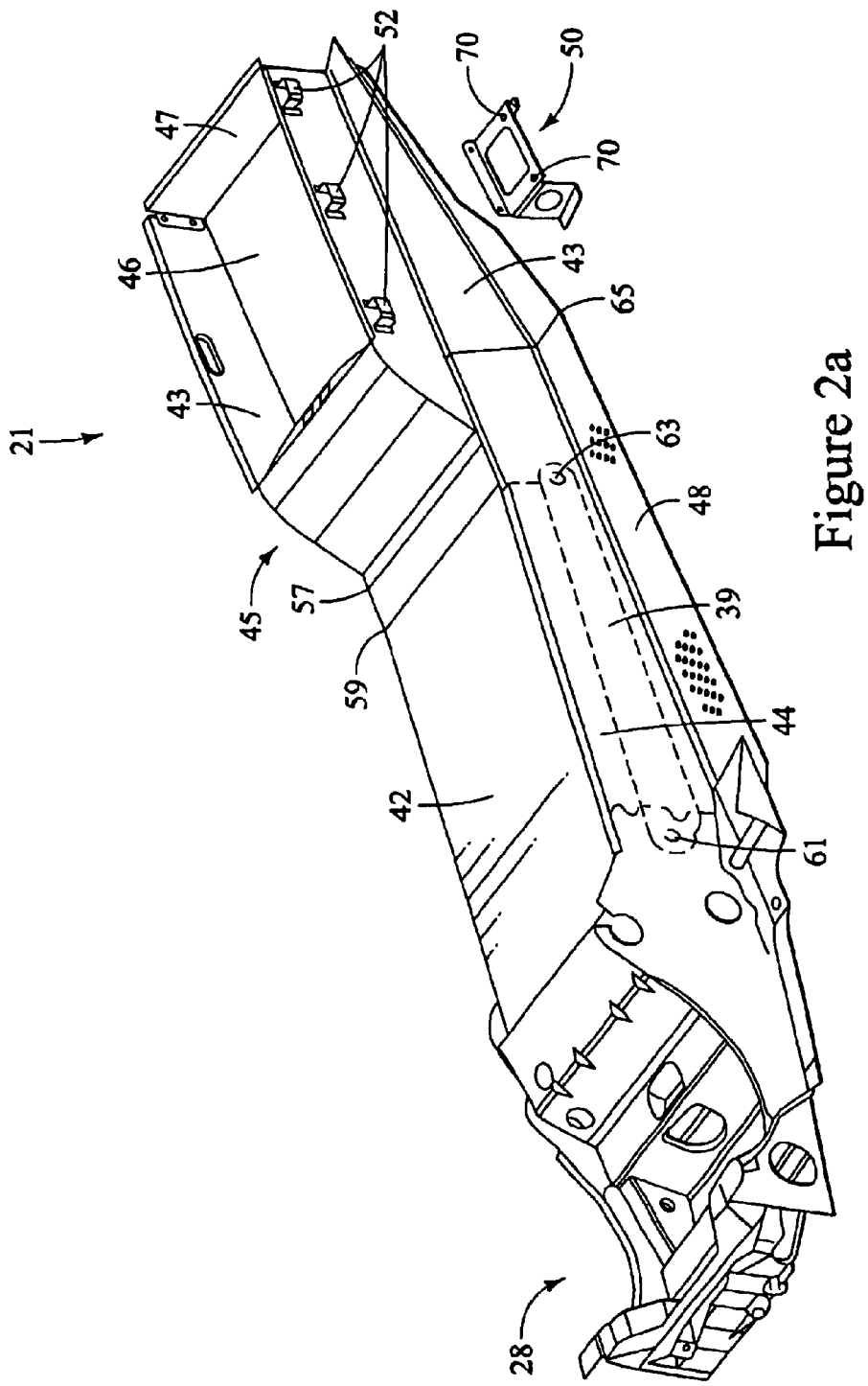
FIG. 2a illustrates a chassis the snowmobile of FIG. 1.

FIG. 2a illustrates a chassis in accordance with the present invention. Beneath the operator's seat area and disposed around the endless drive track, the snowmobile 10 has a longitudinally extending drive tunnel support frame 40. The drive tunnel 40 extends to meet the rear close-off 21, the rear close-off 21 including a rear storage compartment 46. Preferably, the drive tunnel 40 is constructed of aluminum and the rear close-off is made primarily of steel. The drive tunnel 40 has a top portion 42 under the operator's seat. The top portion 42 connects to generally downwardly extending sidewalls 44 that are positioned on opposite sides of the endless track so that the endless track is disposed within the drive tunnel 40. The top portion 42 and extending sidewalls 44 may comprise a single sheet of material formed into the inverted U-shape of the drive tunnel 40. The drive tunnel 40 overlaps the side walls 43 and front wall 45 of the rear storage compartment 46, as will be explained further in reference to FIG. 2b. Thus, the rear storage compartment 46 is coextensive with the drive tunnel side walls 44 and/or the drive tunnel top portion 42. A support plate 39 is provided along the drive tunnel side walls 44. Forward and rearward suspension mounts, 61 and 63 respectively, are provided for mounting the rear suspension. The rearward suspension mount 63 traverses the support plate 39 and the side wall 43 of the storage compartment. The rear suspension includes front and rear suspension arms that are pivotally mounted at the forward and rearward suspension mounts 61 and 63, respectively.

The forward portion of the chassis defines the bulkhead or engine cradle 28 for supporting the engine. The bulkhead 28 or forward portion of the chassis is attached to the middle portion of the chassis, the front inverted U-shaped tunnel section.

Figure 2B:
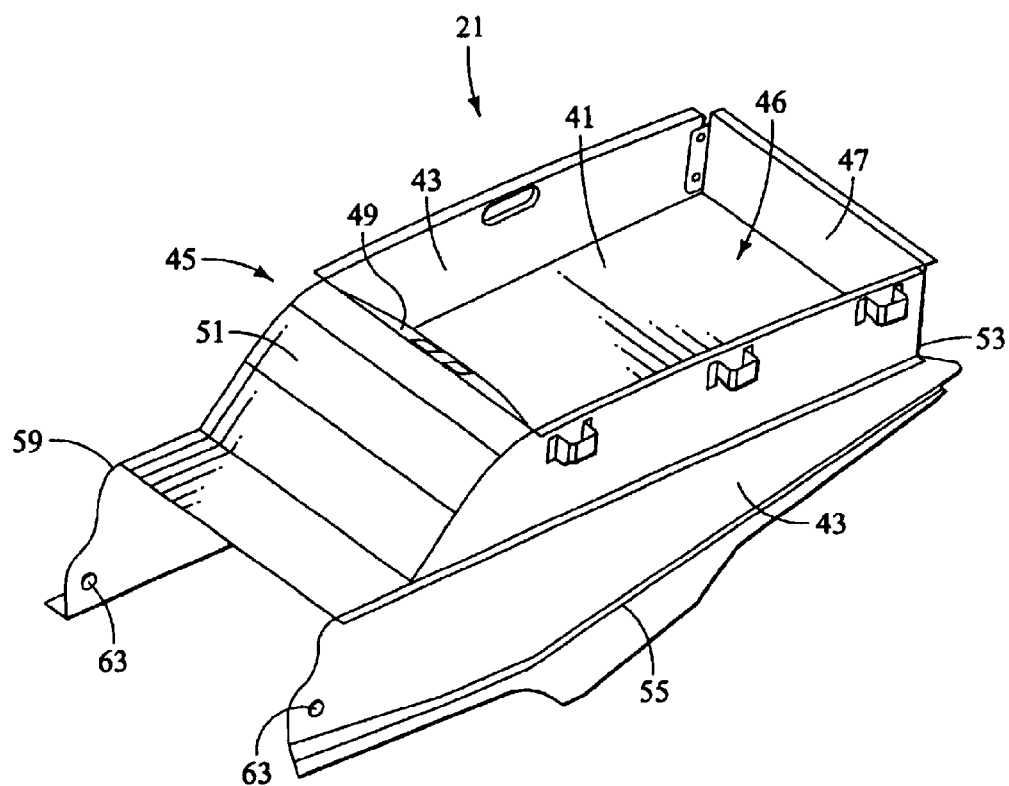
FIG. 2b illustrates a rear close-off including a storage compartment of a snowmobile in accordance with the present invention.

The drive tunnel 40 is coextensive with a rear portion of the chassis, the rear portion of the chassis including a rear close-off 21 that reinforces and acts as an extension of the drive tunnel 40. The rear portion of the chassis defines a rear cargo rack or storage compartment 46. As seen in FIG. 2b, the rear storage compartment 46 comprises a floor 41, two side walls 43, a front wall 45, and a rear wall 47. Preferably, the floor 41 and rear wall 47 are formed of a single piece of material with the floor 41 folding upwardly to form the rear wall 47. The floor 41 and rear wall 47 may be constructed of aluminum. The front wall 45 and side walls 43 are preferably constructed of steel. The front wall, or trunk front close-off, 45 is formed as a tent-structure with a relatively vertical portion 49 facing rearwardly and a curved portion 51 extending to the drive tunnel 40. The side walls 43 and front wall 45 are attached, for example by riveting, to the floor 41. Similarly, the side walls 43 are attached, for example by riveting, to the rear wall 47. As is apparent from FIG. 2b, the side walls 43 extend below the surface of the floor 41 and have two bends 53 and 55 therein. The first bend 53 is located approximately at the plane of the floor 41. The second bend 55 is located at the plane of the floorboard or footrest 48. The bends 53 and 55 form longitudinal edges, such edges providing rigidity to the rear close-off 21 in order to structurally reinforce the drive tunnel 40. Such edges may be sharp edges or may be rounded.

Along the side walls 43, a separation line 65 defines the end of the drive tunnel 40. Forward of the separation line 65, the drive tunnel 40 overlays the side wall 43. The portion of the side wall 43 extending below the bend 55 at the floorboard 48 tapers forwardly and rearwardly from separation line 65, with the forward taper being relatively sharp, the portion of the side wall 43 remaining providing support to the floorboard 48.

The storage compartment 46, as shown, is rectangular. However, the storage compartment 46 may be of any suitable geometry. The entire storage compartment 46 is attached to the middle portion of the chassis (drive tunnel 40). This may be achieved by riveting, for example. Attachment of the storage compartment 46 to the drive tunnel 40 provides stability to the tunnel and replaces or reduces the need for tunnel bracing and rear suspension pads. Two separation lines 57, 59 can be seen in FIG. 2a between the drive tunnel 40 and the storage compartment 46. The separation line 57 defines the end of the drive tunnel. The separation line 59 defines the end of the curved portion 51 of the front wall 45. In the area between the separation line 59 and the separation line 57, the drive tunnel 40 overlays the curved portion 51 of the front wall 45.

Generally horizontal floorboards 48 extend laterally outward from the chassis, extending outwardly from the sidewalls 44 of the drive tunnel 40 and extending rearwardly with the sidewalls 43 of the storage compartment 46. The floorboards 48 may be formed integrally with the drive tunnel 40 (and therefore being thermally conductive therewith). The width of the floorboards 48 preferably tapers rearwardly.

FIG. 2a further illustrates an accessory attachment system on the rear close-off 21 that includes a plurality of mounting points, such as hooks or bracket holes. In one embodiment, the chassis is equipped with a bracket 50 that is mounted to the side of the rear side wall 43, preferably at the separation line 53. The bracket 50 has two openings or holes 70 that are designed to accept mounting pins from an accessory to be mounted to the snowmobile 10. While two openings or holes 70 are shown in the bracket 50, any number of openings or holes (i.e., mounting points) may be provided. Hooks 52 may also be provided on the side wall 43 of the rear storage compartment and may be used to mount accessories or to receive tie straps or bungee cords. As shown, three hooks 52 are provided. However, any suitable number of hooks 52 may be provided and they may be located at any suitable location on the rear close-off. Each of the hooks 52, as shown, includes a front and first and second sides extending rearwardly from the ends of the front. While the front ends of the first and second sides meet the front, the rear ends of the first and second sides attach to the side wall 44. Thus, an opening is defined between the side wall 44, the front, and the first and second sides. Preferably, each hook 52 is formed from a single piece of material. Of course, any configuration suitable for receiving a bungee cord or tie strap may be used as a hook in accordance with the present invention. The hooks are especially suited for use when it is desired to transport cargo that will not fit within the storage compartment 46. Cargo may be strapped over either the abbreviated or the full-length trunk cover or storage lid using bungee cords attaching on either side to the hooks 52. Alternately, the storage compartment 46 may be left open with neither the abbreviated nor the full-length trunk cover or storage lid in use and bungee cords strapped over cargo placed within or over the storage compartment, attaching on either side to the hooks 52.

Figure 5:
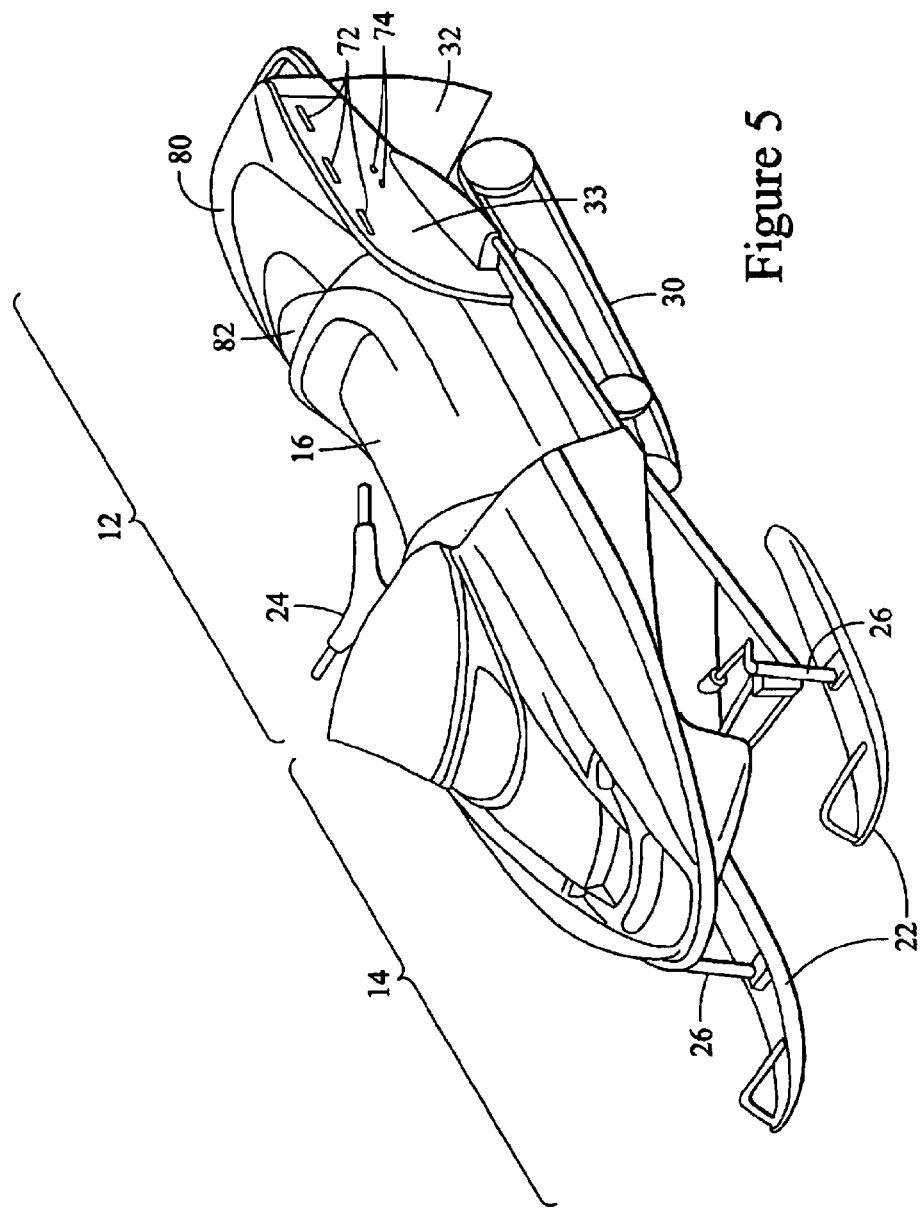
FIG. 5 illustrates a snowmobile in accordance with the present invention with a full storage cover.

Optionally, saddlebags may be provided with attachment pins for attaching to the bracket 50. Each of the bracket 50 and the hooks 52 may be hidden underneath the side panel cover 33. As best seen in FIG. 5, the side panel cover 33 includes holes to receive, for example, bungee cords. Bungee cords may be passed through the holes 33 and attached to the cargo hooks 52 hidden beneath the side panel cover 33. Thus, accessory attachments may be quickly removed without requiring tools. Additional holes 74 may be provided in the side panel cover 33 to accept the attachment pins from the saddlebags. The saddlebag attachment pins then extend through the holes 74 in the side panel cover 33 and into the holes 70 on the bracket 50 on the rear side wall 43. Optionally, the hooks 52 may also be used to support saddlebags.

Figure 3:
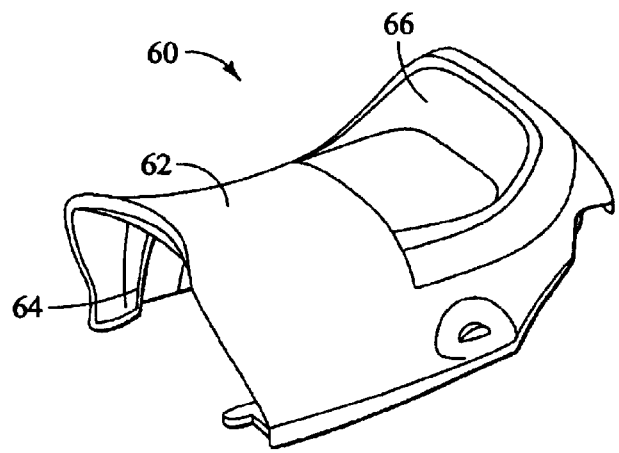
FIG. 3 illustrates an operator's seat for a snowmobile in accordance with the present invention.

A cushioned operator's seat 60 for mounting on the chassis is shown in FIG. 3. The operator's seat 60 has an upper cushioned portion 62 and a lower frame portion 64. The upper cushioned portion 62 provides a support for the operator to sit on. The lower frame 64 portion provides a frame for rigidly supporting the cushioned portion 62. A backrest 66 extends from the upper cushioned portion 62 for supporting the rider's back while riding. The backrest 66 is designed to complement a rear trunk cover or storage lid or a passenger's seat. The seat 60 is preferably bolted to the chassis for secure positioning. Additionally, as seen in FIG. 5, a backrest 82 is integrated into a full-length trunk cover or storage lid for one-up riding.

Figure 4:
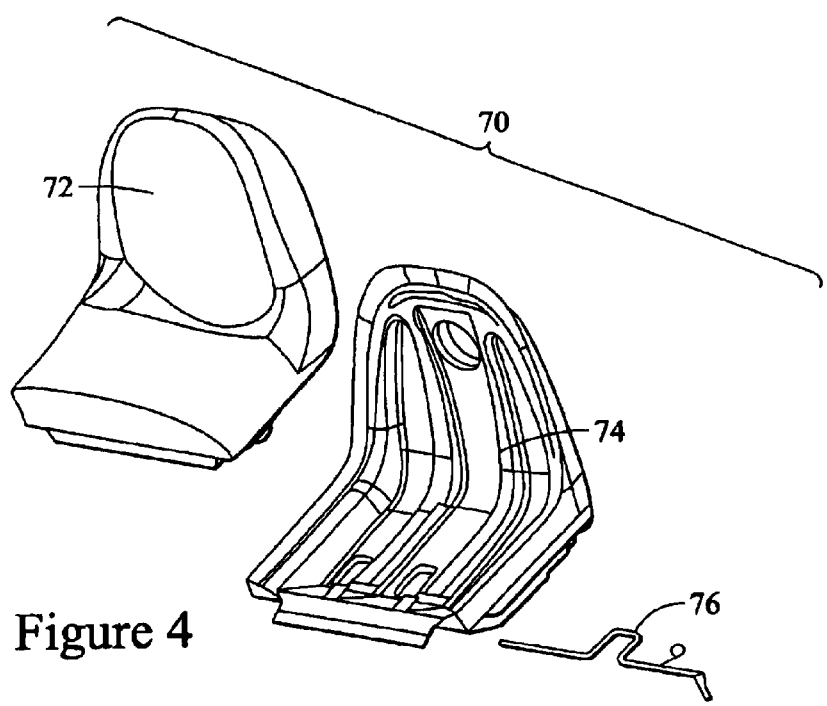
FIG. 4 illustrates an exploded view of a passenger seat for a snowmobile in accordance with the present invention.

FIG. 4 illustrates a sculpted and removable passenger seat 70. Adjustable and heated passenger handgrips (19 of FIG. 1) and adjustable footrests may be provided. The passenger seat 70 includes an upper cushioned portion 72 and a lower frame portion 74. A latch 76, for example, a spring latch, is provided for removably securing the passenger seat 70 over a forward portion of the rear storage area 46 of the snowmobile.

Returning to FIGS. 1 and 2a, the accessible area of the rear storage compartment 46 is expandable by removing the passenger seat 18. Two covers are provided for use with the rear storage area: a full-length cover (80 of FIG. 5) and an abbreviated cover 20. The full-length cover 80 includes an integrated backrest 82 and is for use when the optional passenger seat 18 is not in position on the snowmobile 10 and the snowmobile 10 is configured for one-up riding.

The abbreviated cover 20 is for use with the optional passenger seat 18 in position and when the snowmobile 10 is configured for two-up riding. Thus, the snowmobile 10 may be converted into a one-up sled by removing the abbreviated rear storage cover 20 and passenger seat 18 and affixing the full-length storage cover 80.

As seen in FIG. 5, the full-length cover 80 creates a sleek one-up look while providing increased storage capacity. Additionally, by removing the second seat completely when the snowmobile 10 is in its one-up configuration, the overall weight of the sled is decreased.

While a preferred embodiment of the present invention has been described, it should be understood that various changes, adaptations, and modifications may be made therein without departing from the spirit of the invention and the scope of the appended claims.

What is claimed is:

1. A snowmobile comprising:

a longitudinally extending chassis including a front portion, a central portion, and a rear portion, the front chassis portion having an engine cradle for mounting an internal combustion engine that powers a drive track, the front portion mounting a pair of steerable skis, the central chassis portion including a drive tunnel having the drive track disposed therein, the drive tunnel having opposing right and left generally vertical side walls and a top portion supporting an operator seat for seating an operator in straddle fashion, the rear chassis portion including a rear close-off that reinforces the drive tunnel, the rear close-off defining a storage compartment longitudinally rearward of the operator seat, a passenger seat mounted over the storage compartment for seating a passenger in straddle fashion.

2. The snowmobile of claim 1, wherein the passenger seat is removable.

3. The snowmobile of claim 2, further including a removable storage lid mounted to the rear chassis portion that covers the entire storage compartment when the passenger seat is removed.

4. The snowmobile of claim 3, wherein the storage lid includes an operator backrest.

5. The snowmobile of claim 1, further including a storage lid that covers at least a portion of the storage compartment.

6. The snowmobile of claim 1, wherein the passenger seat covers a forward portion of the storage compartment.

7. The snowmobile of claim 6, further including a storage lid that covers the remainder of the storage compartment rearward of the passenger seat.

8. The snowmobile of claim 1, wherein the passenger seat is positioned upward of the operator seat.

9. The snowmobile of claim 1, wherein the storage compartment is formed from right, left, front, and rear walls extending upwardly from the rear close-off.

10. The snowmobile of claim 9, wherein the storage compartment includes a floor and wherein the right and left walls extend below the plane of the floor.

11. The snowmobile of claim 1, wherein a rear portion of the drive track is disposed within the rear close-off.

* * * * *